May 19, 1959  H. L. BYLAND ET AL  2,886,845
MEAT TENDERIZER
Filed March 28, 1957  5 Sheets-Sheet 1

INVENTORS:
HENRY L. BYLAND
PAUL H. MEYER
BY Marzall, Johnston, Cook & Root
ATT'YS May 19, 1959 H. L. BYLAND ET AL 2,886,845
MEAT TENDERIZER
Filed March 28, 1957 5 Sheets-Sheet 2

INVENTORS:
HENRY L. BYLAND
PAUL H. MEYER
BY
Marzall, Johnston, Cook & Root
ATT'YS INVENTORS:
HENRY L. BYLAND
PAUL H. MEYER
BY Marshall, Johnston, Cook & Root
ATT'YS May 19, 1959

H. L. BYLAND ET AL 2,886,845

MEAT TENDERIZER

Filed March 28, 1957

INVENTORS:
HENRY L. BYLAND
PAUL H. MEYER
BY
Marzall, Johnston, Cook & Root
ATT'YS May 19, 1959     H. L. BYLAND ET AL     2,886,845

MEAT TENDERIZER

Filed March 28, 1957     5 Sheets-Sheet 5

INVENTORS:
HENRY L. BYLAND
PAUL H. MEYER
BY
Marzall, Johnston, Cook & Root
ATT'YS

United States Patent Office 2,886,845
Patented May 19, 1959

2,886,845

MEAT TENDERIZER

Henry L. Byland, Deerfield, Ill., and Paul H. Meyer, La Porte, Ind., assignors to U. S. Slicing Machine Company, Inc., La Porte, Ind., a corporation of Indiana Application March 28, 1957, Serial No. 649,053

17 Claims. (Cl. 17—26)

This invention relates generally to a food processing machine for conditioning foods, and especially to improve and enhance the edibility of such foods as meat, vegetables, and other similar produce by subjecting such foods to food cutting operations. More particularly, the invention deals with a meat tenderizing machine wherein a piece of meat is passed through a pair of coacting knife rolls in order to effect certain cutting operations thereon.

In the interest of hygiene, it is important that a food processing machine such as a meat tenderizing machine be constructed so that it may be easily and quickly dismantled for complete cleaning thereof. Further, in the interests of efficiency and maintenance, the machine should be ruggedly constructed and in such a manner that food juices or particles can not find their way to parts which can be injured by them.

Still another consideration in a machine such as a meat tenderizing machine which includes rotating cutter blades is that it be constructed so that an operator can operate and dismantle the machine safely without risking injury by the cutter blades.

Among the features of the present invention are those which overcome the difficulties set forth in the above paragraphs and others which will be apparent to one skilled in the art.

The meat tenderizing machine of the present invention includes a housing having a meat tenderizing chamber arranged so that the meat will pass directly into the reaches of the cutting rolls and on downwardly to a receptacle or table arranged directly beneath the cutting rollers. The knife frame assembly is constructed so that it may be easily and quickly mounted in operating position in the meat tenderizing chamber of the machine housing and locked into position by a simple sliding movement. While the knife rolls are mounted for easy removal from the knife frame assembly, they are automatically locked to the assembly when the assembly has been positioned on certain supporting members of the housing. Inasmuch as the knife rolls must be arranged at a certain position relative to the knife roll assembly, identifying means on each knife roll and a point on the frame assembly indicates which end of the knife roll should be located at which end of the knife frame assembly and which side of the knife frame assembly should carry which knife roll. Driven members are carried on the ends of the knife rolls which engage driving members in the housing, the driven and driving members constituting clutches. Should the knife rolls bind and stop during the operation of the machine, turning off the machine effects unbinding of the knife rolls and automatic disengagement of the rolls from the driving members so that the knife frame assembly and rolls may be easily removed therefrom for cleaning purposes. The particular clutches which include the driven member on each knife roll and the drive member mounted in the machine housing are such as to provide greater loads to be absorbed since increased loads merely tighten the connection between the drive and driven members.

It is therefore an object of this invention to provide a new and improved food processing machine for effecting cutting operations on various foods, wherein the machine may be easily and quickly dismantled for cleaning purposes, and wherein the machine is constructed so that complete cleaning thereof is made easier and food particles and juices can not penetrate to those parts which might be injured thereby.

Another object of this invention resides in the provision of a meat tenderizing machine, wherein the knife frame assembly may be easily and quickly locked into operative position on the machine housing without the use of any tools.

Still another object of this invention is in the provision of a meat tenderizing machine having a knife frame assembly, wherein the knife rolls are automatically locked to the assembly when the assembly is mounted in the meat tenderizing chamber of the machine.

A further object of this invention is to provide a knife frame assembly having a pair of knife rolls easily and freely mounted on the knife frame assembly, and wherein placing of the assembly on certain mounting pins carried within the meat tenderizing chamber of the machine automatically locks the rolls to the knife frame, and a further sliding motion given to the assembly effects locking of the assembly to the supporting pins and connection of the rolls to the drive means.

A still further object of this invention is in the provision of identifying means mounted in the ends of the knife rolls and on the knife frame which indicates which end of the knife rolls should be positioned adjacent which end of the knife frame and on which side of the knife frame.

Another object of this invention is to provide a meat tenderizing machine which is faster operating, easier to clean, easier to disassemble, and permits easier removal and insertion of the knife rolls.

Still another object of this invention resides in the provision of a meat tenderizing machine having a drive means which, should the knife rolls bind during operation, effects disconnection of the knife rolls from the drive means upon deenergization of the motor.

Still another object of this invention is in the provision of a clutch for connecting each knife roll to the drive means, wherein the knife roll is held in an engaged position by the rotational forces exerted from the drive means.

A further object of this invention is to provide a meat tenderizing machine having improved strippers scraping directly against the blade spacers, thereby keeping the blade assembly cleaner during the operation thereof.

Other objects, features, and advantages of the invention will be apparent from the following detailed disclosure taken in conjunction with the accompanying sheets of drawings, wherein like reference numerals refer to like parts, in which.

Figure 1:
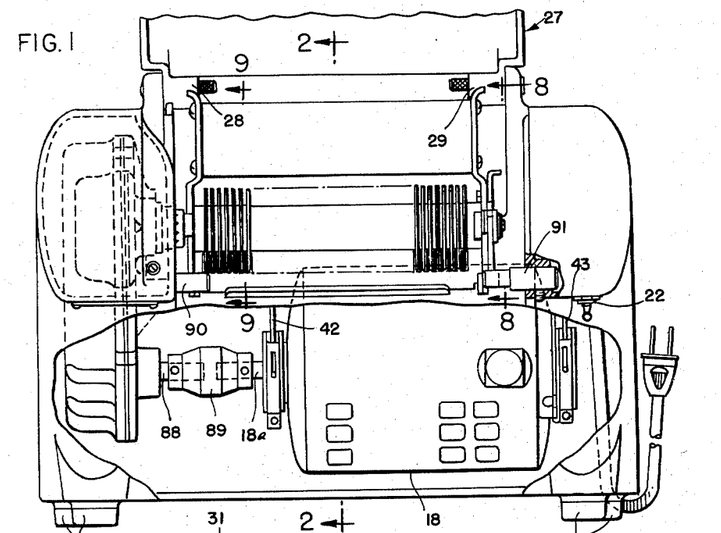
Fig. 1 is a front elevational view of a meat tenderizing machine embodying the invention with parts broken away and the cover in up position and fragmentary.
Figure 2:
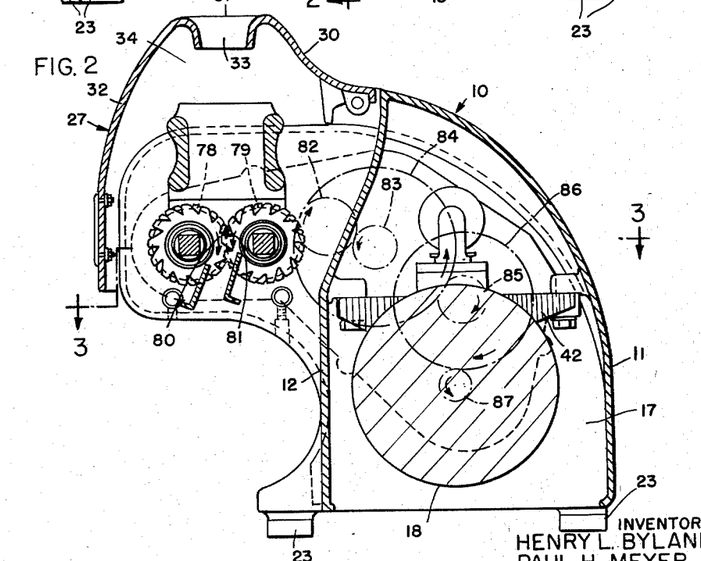
Fig. 2 is a transverse sectional view, taken substantially along line 2—2 of Fig. 1, and illustrating the gear train arrangement for transmitting power from the motor to the knife rolls.
Figure 3:
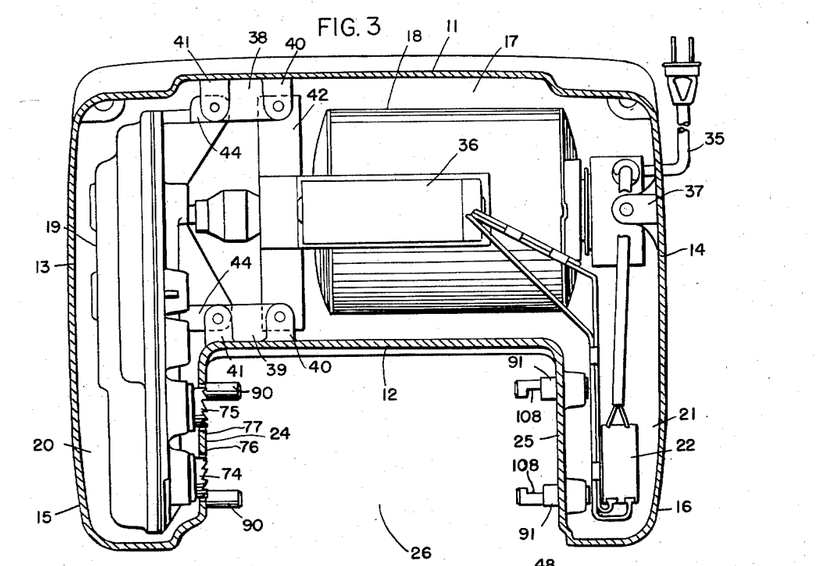
Fig. 3 is a top plan view of the meat tenderizer with the housing broken away therefrom to illustrate the positioning of the inner working parts.

Referring to the drawings, one embodiment of the invention is herein illustrated as a meat tenderizing machine which includes a housing or casing 10 formed in a single casting, Figs. 1, 2, and 3, that may be coated with any material such as vitreous or enamel. The housing is preferably contoured throughout to provide smooth surfaces and avoid ledges, corners and the like on or in which dirt or other food particles could collect.

This housing comprises a rear wall 11, a front wall 12 and opposed upstanding end walls 13 and 14. The rear wall 11 has its upper end bent toward the front wall, while the upper end of the front wall 12 is bent toward the rear wall, and the upper ends of the front and back walls are joined together. At the opposite upper ends of the housing, hollow projecting portions 15 and 16 extend forwardly of the machine to serve on the one hand as cantilever supports for the knife frame assembly, as will be more clearly described hereinafter, and on the other hand to house certain operating components of the machine. The rear ends of these projecting portions communicate with the interior of the housing. The front, rear, and end walls define primarily a motor chamber 17 for housing an electric motor 18. At the left hand end of the motor chamber 17, a portion of the gear case for a reduction gear assembly 19 is also housed, while the upper end of the gear case extends into the upper gear chamber 20 defined by the forwardly projecting hollow portion 15. The opposite projecting portion 16 defines the switch chamber 21 for housing the on-off switch 22 of a conventional type having its control lever extending downwardly from the bottom wall of the projecting portion, as seen in Fig. 1. In order to provide adequate air circulation to the motor 18, the housing 10 is elevated from its supporting surface by rubber feet 23, Figs. 1 and 2, which are suitably secured to the bottom of the housing around the open end thereof.

The hollow projecting portions 15 and 16 include inner end walls 24 and 25 which coact with the upper portion of the front wall 12 to define a food conditioning or meat-tenderizing chamber 26, Fig. 3. This chamber is enclosed on its top and front side by a cover 27 hinged along its rear edge to the housing 10 at 28 and 29, Fig. 1. This cover includes an arcuate rear wall 30 continuing from the upper edge of the housing rear wall 11 and bending upwardly to join the top wall 31. An outwardly bulging front wall 32 extends from the forward edge of the top wall 31 and terminates downwardly just short of the bottom edges of the projecting portions 15 and 16, Fig. 2. An elongated meat receiving opening 33 is formed in the top wall 31 through which meat or food is passed into the food conditioning or meat tenderizing chamber 26. When the machine is being operated, the cover 27 will be arranged in its down position as seen in Fig. 2 to guard against accidental contact with the rotating knife rolls, while when the machine is being cleaned, the cover may be set in its up position as seen in Fig. 1. Opposite end walls 34 complete the cover 27 and extend between the back and front walls 30 and 32 and downwardly from the top wall 31 to the upper edges of the projecting portions 15 and 16.

Power is supplied to the electric motor 18 through an electric cord 35 which is connected to the motor through the on-off switch 22 and a conventional starting coil 36. Extending inwardly from the end wall 14 is a mounting lug 37, and extending inwardly from the rear and front walls 11 and 12 are mounting lugs 38 and 39, respectively. The lugs 38 and 39 include spaced thickened portions 40 and 41. The motor 18 is supported at its output end by a motor bracket 42, Figs. 1, 2, and 3 and at its other end by a motor bracket 43, Fig. 1. The motor bracket 42 is secured at its opposite ends to the thickened portions 40 of the lugs 38 and 39, while the motor bracket 43 is secured to the lug 37. Although not specifically shown, the brackets 42 and 43 resiliently support the motor 18. The gear case of the reduction gear assembly 19 is provided with an integrally formed bracket having spaced mounting portions 44, Fig. 3, which are secured to the thickened portions 41 of the mounting lugs 38 and 39.

Thus, the motor and the gear case of the reduction gear assembly are rigidly mounted on the housing of the machine.

Removably supported within the meat conditioning or tenderizing chamber 26 is a knife frame assembly, generally designated by the numeral 45, and which generally includes a knife frame 46, front and rear knife rolls 47 and 48, and front and rear stripper plates or combs 49 and 50.

The knife frame 26 includes parallel spaced end plates 51 and 52 secured to and held together by parallel spaced front and back bars 53 and 54 that may have their outer vertical faces concavely formed, as shown in the drawings, in order to better facilitate gripping of the knife frame by the hands of the user when the knife frame assembly is removed from or inserted into the meat tenderizing chamber 26. The front and back bars further coact with the end plates to define a passageway through which the meat passes on its way toward the knife rolls 47 and 48.

Figure 10:
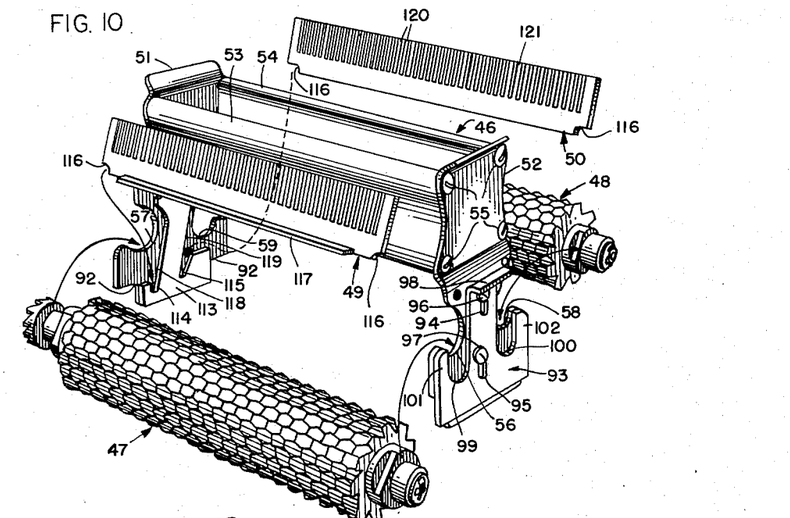
Fig. 10 is an exploded perspective view of the knife frame blades and stripper assembly.

Spaced below the front bar 53, a pair of aligned open bearing supports 56 and 57 are provided in the end plates 51 and 52 to freely receive the opposite ends of the front knife roll 47, while spaced below the rear bar 54 is a pair of similar open bearing supports 58 and 59 which receive the rear knife roll assembly 48. As seen in Fig. 10, when the knife frame 46 is removed from the machine, the knife rolls may be easily inserted in or removed from the bearing supports. These bearing supports are substantially U-shaped with their longitudinal axes extending substantially along the horizontal.

Referring now particularly to Figs. 4, 5, 6, and 7, each knife roll is seen to include a substantially square shaft 60 having received thereon in spaced relation therealong a plurality of disc-shaped blades or cutters 61 separated by formed blade spacers 62. Each blade 61 is provided with a centrally located square opening for coacting with and being received on the shaft 60 in order to prevent relative rotation therebetween. The blade spacers 62 are preferably formed of nylon, but in order to facilitate assembling of the knife roll, a pair of solid metal blade spacers 63 are arranged on one end thereof. The spacers and blades are maintained under compression by collars 64 and 65. The collar 64 is keyed to the shaft 60 to prevent relative rotation therewith by key ways and a key 66, and is held in place on the end of the shaft by a stud bolt or screw 67. Arranged between the head of the stud bolt 67 and the collar 64 is a clutch member 68 adapted to be connected to another clutch member in order to drive the knife roll as will be more clearly explained hereinafter. A bearing 69 is journalled on a stub shaft 70 extending outwardly from the end of the collar 65 and held thereon by a retainer 71. More specific details on the knife roll assembly parts and how it is assembled are disclosed in the copending application of Paul H. Meyer, Serial No. 649,197, filed March 28, 1957.

Figure 11:
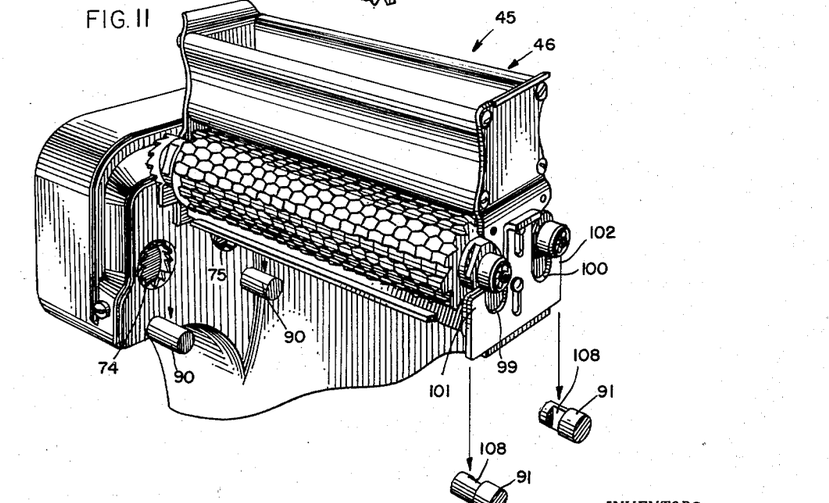
Fig. 11 is a perspective view of the knife frame assembly with the knife rolls positioned on the knife frame, and showing a fragmentary perspective view of a portion of the machine, and illustrating the manner in which the knife frame assembly is inserted into the meat tenderizing chamber and mounted on the supporting pins of the machine.
Figure 12:
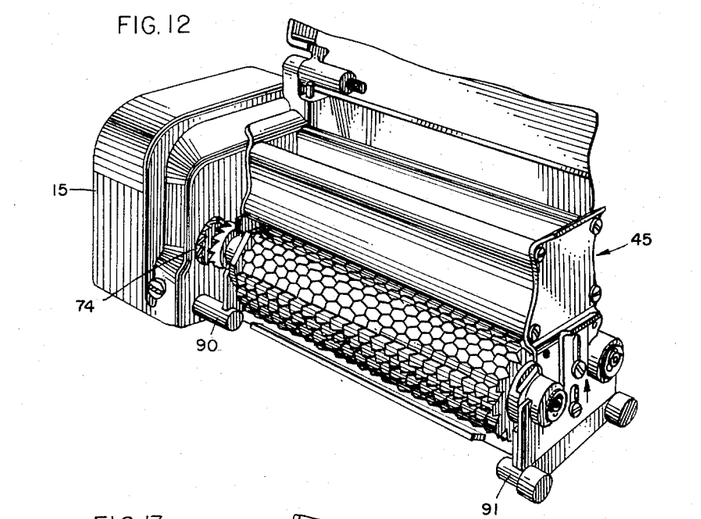
Fig. 12 is a view similar to Fig. 11, illustrating the knife frame assembly as being inserted into the meat tenderizing chamber and in resting position on the supporting pins.
Figures 13, 14:
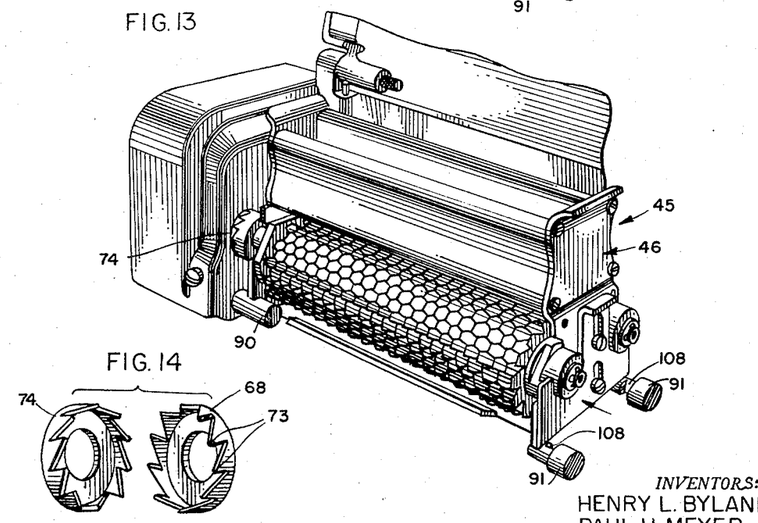
Fig. 13 is a view similar to Fig. 12, but illustrating the shifting movement given to the knife frame assembly to effect engagement of the clutch and illustrate the operative position of the knife frame assembly within the machine.
Fig. 14 is a perspective view of the clutch members and illustrating how they are brought into engagement to effect connection thereof.

In mounting the knife rolls on the knife frame, as seen in Figs. 11, 12, and 13, the bearings 69 bear against the bearing supports 56 and 58 in the end plate 52. The collar 64 at the other end of the rolls is reduced diametrically to define between it and the clutch member 68 an annular groove with a bearing surface 72 which directly contacts the bearing supports 57 and 59 at the end plate 51. Since this end of the shaft of each knife roll connects to the drive means, there will not be an appreciable amount of weight bearing against the bearing supports 57 and 59, and therefore there need not be a bearing assembly such as that provided at the other end of the knife rolls.

Figure 4:
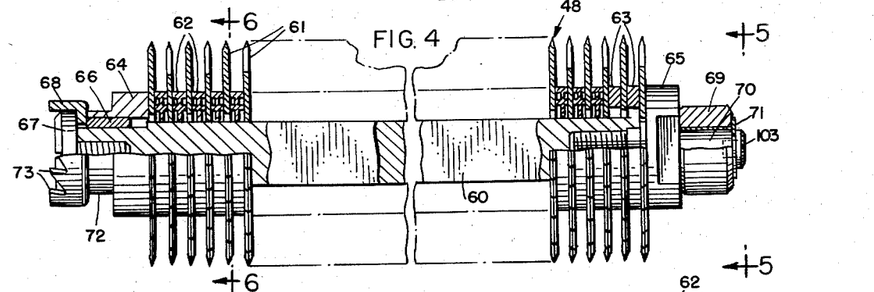
Fig. 4 is a broken elevational view, partly in section, of the knife roll assembly employed in the meat tenderizing machine of the present invention.
Figure 5:
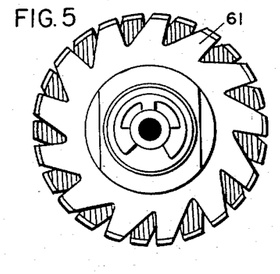
Fig. 5 is an end elevational view of the knife roll assembly, taken substantially along line 5—5 of Fig. 4 and looking in the direction of the arrows.
Figure 6:
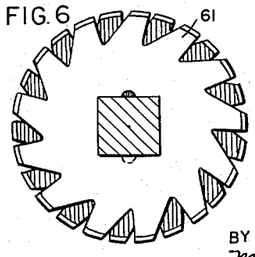
Fig. 6 is a transverse sectional view taken substantially along line 6—6 of Fig. 4.
Figure 7:
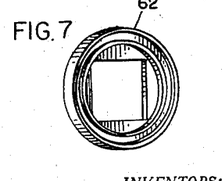
Fig. 7 is a perspective view of a blade spacer utilized in the assembly of the knife rolls shown in Fig. 4.

The manner in which the knife rolls are driven constitutes an important feature of the invention. Each clutch member 68 is generally cup-shaped and provided with a non-circular opening centrally thereof to be received on the end of the shaft 60, Figs. 4 and 10 to 14. Circumferentially spaced and axially extending teeth 73 are formed on the lip of the cup-shaped clutch member, and these teeth are slanted opposite to the direction of rotation of the knife roll, as seen in Fig. 4 with respect to the rear roll 48 and in Fig. 14 with respect to the front roll 47. Inasmuch as the front and rear rolls rotate in opposite directions, the teeth on their respective clutch members will be slanted in opposite directions. These driven clutch members 68 engage similar but complementary shaped clutch driving members supported on output shafts of the reduction gear assembly. These driven clutch members include clutch members 74 and 75, Figs. 3 and 11, which have their teeth slanted forwardly in the direction of rotation thereof. Thus, the clutch driven members 68 of a knife roll assembly coact with the clutch driving members 74 and 75 to define a clutch in association with each knife roll assembly. Fig. 12 illustrates the clutch member 74 and the associated clutch member 68 of the front knife roll prior to engagement, while Fig. 13 illustrates these clutch members in engagement with one another. Fig. 14 shows the clutch members and the manner in which they will be brought together so that the teeth properly mate with each other. This clutch arrangement provides that greater load be absorbed which increases the connection between the clutch members due to the pitch of the mating teeth; and since the teeth of the driving clutch members are slanted forwardly in the direction of rotation, the driven clutching member will be held in an engaged position by the rotational forces exerted from the clutch driving member.

The driving clutch members 74 and 75 are mounted on output shafts of the reduction gear assembly 19 and arranged in circular openings 76 and 77, Fig. 3 formed in the end wall 24 of the projecting portion 15. However, these clutch drive members do not engage these openings but are arranged to freely rotate therein. The output shaft of the clutch driving members are driven in unison by meshing gears mounted thereon of the same size and denoted in dotted lines as indicated at 78 and 79, Fig. 2. Accordingly, the gears rotate the clutch driving members and the knife rolls in opposite directions and toward each other from top to bottom as seen by the indicating arrows 80 and 81 in Fig. 2. The remainder of the gear train of the reduction gear assembly includes an idler gear 82 mounted on an idler shaft and engaging the one pinion gear 79, and also being in engagement with a gear 83 mounted on a countershaft within the gear casing. Also mounted on the countershaft is a larger gear 84 which engages another small gear 85 mounted on another countershaft. Also mounted on this countershaft is a second large gear 86 which engages the drive gear 87 mounted on the input shaft 88, Fig. 1 of the reduction gear assembly. As seen in Fig. 2, the input shaft 88 is connected to the motor shaft 18a by means of a resilient coupling 89, the operation of which will be more clearly hereinafter described.

In order to support the knife frame assembly in the meat tenderizing chamber 26, pins 90 are mounted in the end wall 24 of the projecting portion 15, and pins 91 are supported in the end wall 25 of the projecting portions 16. These pins extend inwardly into the meat tenderizing chamber 26 and are held in place in the end walls 24 and 25 by set screws, such as are shown in connection with the pin 91 in Fig. 1. The housing end walls are provided with bosses and openings therein to receive these pins and hold them rigidly on the machine housing. The pins 90, Figs. 1, 3, 9, 11, 12, and 13 are cylindrical in shape and slidably receive notches 92, Figs. 9 and 10, of the knife frame 46. These notches are formed in the end plate 51 of the knife frame 46 so that they open downwardly and laterally and have arcuate portions for engaging the pins 90.

Due to the construction of the knife frame 46 wherein the knife rolls are inserted and positioned on the bearing support from opposite sides of the knife frame it is readily seen that unless the knife frame assembly is held in upright position the knife rolls may easily fall off of the knife frame. The knife blades of the knife roll assemblies are quite sharp and may easily damage property on which it might hit, or injure the hand or foot of a person.

Accordingly, a locking plate 93 is slidably mounted on the outer face of the end plate 52. This locking plate is provided with upper and lower slots 94 and 95 which receive screws or bolts 96 and 97 fashioned to permit vertical slidable movement of the locking plate with respect to the end plate 52. The head of these screws 96 and 97 prevent the locking plates from leaving the confines of the end plate 52. The upper end of the locking plate 93 is bent outwardly to define a lip or flange 98 which may be easily grasped by the user in order to pull the locking plate into its up or "lock" position. Spaced U-shaped notches 99 and 100 are formed in the locking plate 93 which define lugs 101 and 102, respectively. These lugs cover a sufficient amount of the open end of the respective bearing supports 56 and 58 in the end plate 52 when the locking plate is raised to its up or "lock" position, as seen in Figs. 12 and 13, and in full lines in Fig. 8 as to lock the bearing end of the knife rolls to the knife frame. When the locking plate is in its lower position, as seen in Figs. 10, 11, and in dotted lines in Fig. 8, the respective supporting bearings 56 and 58 are opened at the side to allow removal or insertion of the bearing end of the knife rolls 47 and 48. Thus, when disassembling or assembling the machine and especially with respect to the knife frame assembly if desired, the operator may hold the locking plate 93 into its up position and lock the knife rolls into the knife frame.

Figure 8:
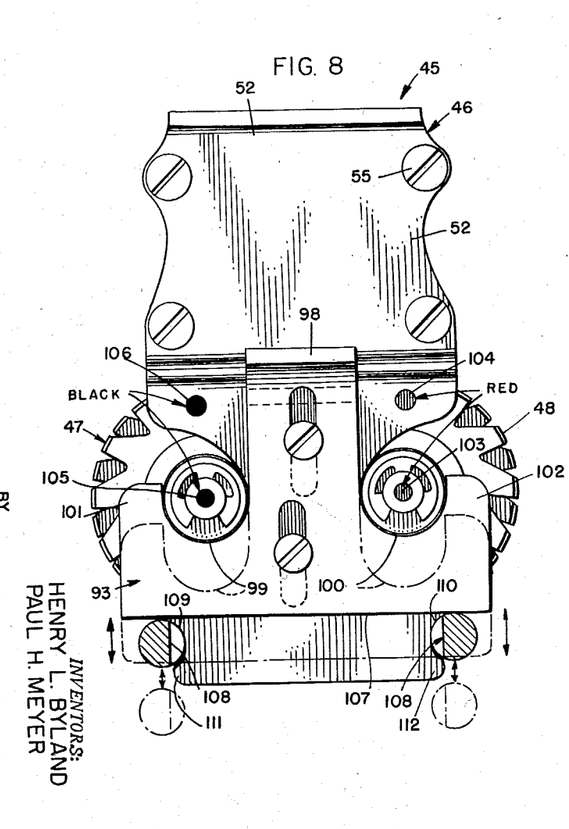
Fig. 8 is an end elevational view of the knife frame assembly embodying the invention and illustrating the locking and unlocking positions of the knife roll locking plate.

Inasmuch as it is important that the front and back knife roll assemblies 47 and 48 be assembled on the knife frame as shown, and in order to avoid a mixup of the knife roll assemblies, a colored identifying plug is inserted into the very end of each knife of the roll shaft 60 such as the plug 103 in the roll 48, Figs. 4 and 8. As seen in Fig. 8, a similar identifying plug 104 of the same color is mounted directly above the bearing support for the roll 48. These plugs are preferably of nylon, and for example may be red in color. Similarly, an identifying plug 105 is found in the end of the shaft of the knife roll assembly 47 and is of the same color as an identifying plug 106 mounted above the bearing support in the end plate 52. These plugs 105 and 106 will be of a different color, and for example, may be black. Thus in inserting the knife rolls 47 and 48 on the knife frame, matching of the colored plugs will indicate that the knife rolls are positioned in the proper location.

It is also desirable that the ends of the knife rolls carrying the bearings 69 and which are mounted in the end plate 52 be locked in position during operation of the machine in order to prevent this end of the roll from jumping out of the bearing supports. The other end of the roll will, of course, be held in place by engagement with the clutch driving members 74 and 75. Accordingly, it is desirable that the locking plate 93 be automatically positioned into its locking position when the frame assembly is supported on the supporting pins 90 and 91. To accomplish this, the locking plate extends downwardly to the extent that when the knife frame assembly is mounted on the pins 90 and 91, the pins 91 automatically engage the lower edge 107 of the locking plate 93 and as the frame assembly moves downwardly onto the pins, the locking plate is moved upwardly to the position such as shown in Fig. 8.

Since the operation of the knife rolls might tend to cause movement of the knife frame assembly from the pin supports, it is desirable to lock the knife frame assembly and knife rolls to the pin supports and the housing of the machine during operation thereof. Of course, the engagement between the clutch driving members 74 and 75 and the clutch driven members 68 of the knife roll assemblies effectively locks that corresponding end of the knife frame assembly and the rolls to the machine. In order that the other end of the knife frame be locked to the machine, the pins 91 are vertically slotted on the inner facing sides to define opposed slots 108, Figs. 3, 8, and 11. The bottom end of the end plate 52 is similarly notched at 109 and 110, Fig. 8, as the end plate 51 in order that notches define seats for the supporting pins 91. In addition, the lower end of the notches 109 and 110 are provided with outwardly extending integral lugs 111 and 112 which are arranged to pass through the slots 108 when the knife frame assembly is dropped vertically onto the supporting pins and to partially encircle the pins when the knife frame assembly is shifted to bring the clutch driving and driven members into engagement, Fig. 8. As the knife frame assembly is initially dropped onto the supporting pins 90 and 91, the clutch driving members will be spaced apart as seen in Fig. 12 and the lugs 111 and 112 will be aligned with the slots 108 of the supporting pins 91. When the knife frame assembly is shifted toward the hollow projecting portion 15, the clutch driven and driving members are engaged as seen in Fig. 13 and the lugs 111 and 112 move away from alignment with the slots 108 to encircle the cylindrical end of the pins 91 so that the end plate 46 and respective end of the knife frame assembly is locked to the supporting pins 91 and can not be removed therefrom. As already explained in connection with the clutch driven and driving members, the slanting of the teeth on the clutch driving members is in the direction of rotation and so the driven members are held in an engaged position by the rotational forces exerted by the driving member. As long as the machine is in operation, the knife frame assembly can not be shifted toward the pins 91 in order to align the lugs 111 and 112 on the end plate 52 with the slots 108 of the pins 91 and allow removal of the knife frame assembly from the machine.

Figure 9:
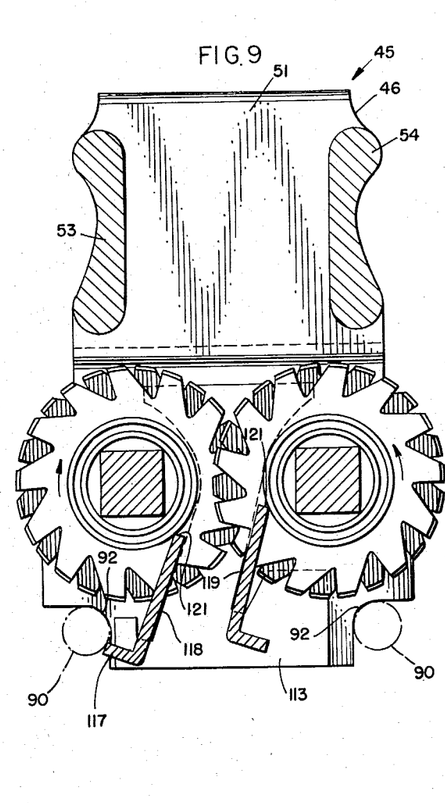
Fig. 9 is a transverse sectional view taken through the knife frame assembly, and illustrating the manner in which the stripper plates are mounted in the knife frame and the manner in which they engage the blade spacers of the knife rolls.

A pair of stripper mounting plates 113, identical in shape and in configuration are suitably secured to the inner sides of the end plates 51 and 52, Figs. 9 and 10, and are provided with slots 114 and 115 for receiving ends of the stripper plates 49 and 50 and supporting them properly within the knife frame assembly. These mounting plates may preferably be spot welded to the end plates 51 and 52, although they may be secured thereto in any other suitable manner. The opposite lower corners of each stripper plate are notched at 116, Fig. 10, in order to permit the positioning of the strippers within the frame assembly as seen in Fig. 9 for it is these notches which are received in the slots 114 and 115. In order to facilitate handling of the stripper plates when inserting them in the knife frame assembly or taking them out thereof, an outwardly extending lip or flange 117 is provided at the bottom of each stripper so that the operator may easily grasp the stripper at this point and remove it from the slots in the frame assembly. When the strippers are in position the very ends and inner sides bear against the substantially parallel bearing faces 118 and 119 of each mounting plate 113, Figs. 9 and 10. Consequently, further inward movement of the plates is prohibited by these bearing faces, while the knife roll assemblies themselves preclude a moving of the stripper plates outward of the assembly after the knife roll assemblies have been positioned on the knife frame. As seen in Fig. 10, assembly arrows indicate the manner in which the stripper plates and the knife rolls are assembled on the knife frame. Of course, the stripper plates are first inserted in their respective grooves or slots, and then the knife roll assemblies are inserted on the bearing supports so that the complete assembly is ready for installation in the tenderizing chamber of the machine.

Each stripper plate includes a plurality of spaced stripper fingers 120 which are arranged so that one stripper finger will intermesh between each adjacent pair of knife blades on the knife roll assemblies. The very end of the stripper fingers are flatted to thereby define a substantially sharp edge portion 121, Fig. 9, which bears directly against the blade spacers 62 and effects a scraping function thereon in order to remove all meat and food particles from between the knife blades. This direct scraping action against the blade spacers thereby maintains the blade assembly very clean.

In operation of the machine, should something become lodged between the knife rolls and bind the knife rolls so that they will stop, the resilient coupling 89, preferably made of rubber, winds up or has a torque generated therein. Upon turning off of the electric motor, the coupling 89 will tend to unwind and in doing so will transmit a reverse motion inertia to the motor shaft 18a and its associated components within the motor. This reverse motion inertia will be transmitted through the coupling 89 and the reduction gear assembly 19 to transmit a reverse motion inertia or rotation to the clutch driving members 74 and 75 which, because of the teeth on the clutch members being slanted in the direction of drive rotation, will automatically unload all of the moving parts of the machine and automatically kick the knife frame assembly away from the clutch driving members to its disengaged position so that it may be easily lifted out and the difficulty corrected. This kicking action is caused by the teeth on the clutch driving members effecting a camming action against the teeth on the clutch driven members to thereby quickly separate the clutch members. Without the resilient coupling 89, it would be extremely difficult, to loosen the knife rolls without injuring them should they be rendered non-operative for some reason or the other. However, the use of this resilient coupling in connection with the present machine is an important feature of the invention in order to unload all of the parts upon turning off of the machine should they bind at any time.

From the foregoing, it is apparent that the meat tenderizing machine of the present invention is constructed so that all of those parts coming in contact with the meat during the conditioning thereof may easily be removed and completely disassembled so that they can be readily cleaned and they may be just as easily reassembled for placing the machine back into operation. Further, the arrangement of parts is simple and such that more efficient and faster operation can be accomplished in order to increase the production of the machine.

It will be understood that modifications and variations may be effected without departing from the scope of the novel concepts of the present invention, but it is understood that this application is to be limited only by the scope of the appended claims.

The invention is hereby claimed as follows:

1. A meat tenderizing machine comprising a housing, said housing having a bottomless chamber for receiving and tenderizing meat, a cover for selectively opening and closing said chamber, said chamber defined by opposed end walls, a rear wall and said cover, supporting pins extending inwardly from said end walls, a knife frame assembly supported on said pins, said knife frame assembly including a knife frame, a pair of knife rolls and means carried by said knife frame assembly and engageable with one of said pins for locking said knife rolls to said knife frame upon positioning of the assembly on said pins.

2. A meat tenderizing machine comprising a housing, said housing having a bottomless chamber for receiving and tenderizing meat, a cover for selectively opening and closing said chamber, said chamber defined by opposed end walls, a rear wall and said cover, supporting pins extending inwardly from said end walls, a knife frame assembly supported on said pins, said knife frame assembly including a knife frame, a pair of knife rolls, and means carried by said knife frame assembly and engageable with one of said pins for locking said knife rolls to said knife frame upon positioning of the assembly on said pins, driven elements mounted on one end of said rolls, driving elements mounted in one of the end walls adapted to be selectively engaged by said driven elements, and means on said knife frame coacting with some of the pins to lock the knife frame assembly to said pins when the driven and driving elements are engaged.

3. A meat tenderizing machine comprising a housing, said housing having a bottomless chamber for receiving and tenderizing meat, a cover for selectively opening and closing said chamber, said chamber defined by opposed end walls, a rear wall and said cover, supporting pins extending inwardly from said end walls, a knife frame assembly supported on said pins, said knife frame assembly including a knife frame, a pair of knife rolls and means carried by said knife frame assembly and engageable with one of said pins for locking said knife rolls to said knife frame upon positioning of the assembly on said pins, driven elements mounted on one end of said rolls, driving elements mounted in one of the end walls adapted to be selectively engaged by said driven elements, and means on said knife frame coacting with some of the pins to lock the knife frame assembly to said pins when the driven and driving elements are engaged, said driven and driving elements including clutches which act to hold the driven elements in an engaged position by the rotational forces exerted from the driving elements thereby maintaining said knife frame assembly locked to said pins.

4. A meat tenderizing machine comprising a housing, said housing having a bottomless chamber for receiving and tenderizing meat, a cover for selectively opening and closing said chamber, said chamber defined by opposed end walls, a rear wall and said cover, supporting pins extending inwardly from said end walls, a knife frame assembly supported on said pins, said knife frame assembly including a knife frame, a pair of knife rolls and means carried by said knife frame assembly and engageable with one of said pins for locking said knife rolls to said knife frame upon positioning of the assembly on said pins, driven elements mounted on one end of said rolls, driving elements mounted in one of the end walls adapted to be selectively engaged by said driven elements, and means on said knife frame coacting with some of the pins to lock the knife frame assembly to said pins when the driven and driving elements are engaged, said driven and driving elements including clutches which act to hold the driven elements in an engaged position with the driving elements by the rotational forces exerted from the driving elements thereby maintaining said knife frame assembly locked to said pins, each clutch including circumferentially arranged and axially extending teeth slanted forwardly in the direction of driving rotation.

5. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame, a pair of knife rolls and means carried by said knife frame assembly and engageable with one of said pins for locking said knife rolls to said knife frame upon positioning of the assembly on said pins.

6. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame and a pair of knife rolls rotatably carried by said frame, a driven member mounted on one end of each roll, a pair of driving members journalled in one of the end walls adapted to be selectively engaged by said driven members for driving the rolls in opposite directions, said knife frame assembly being slidable along said pins between first and second positions, and means on said knife frame assembly coacting with at least one of the pins on said other end wall to automatically lock the end of the knife frame assembly adjacent to said other end wall to a corresponding pin when the assembly is in the position where the driven and driving members are engaged.

7. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame and a pair of knife rolls rotatably carried by said frame, a driven member mounted on one end of each roll, a pair of driving members journalled in one of the end walls adapted to be selectively engaged by said driven members for driving the rolls in opposite directions, said knife frame assembly being slidable along said pins between first and second positions, and means on said knife frame assembly coacting with at least one of the pins on said other end wall to automatically lock the end of the knife frame assembly adjacent to said other end wall to a corresponding pin when the assembly is in the position where the driven and driving members are engaged, said locking means including a vertical slot spaced inwardly from the free end of at least one of the said pins, and a locking plate on said knife frame assembly which will permit resting of the assembly on the pins when the assembly is dropped vertically with the plate aligning with the slots in the pins, but which will not permit upward movement of the assembly when the assembly has been shifted to a position whereby the driven and driving members interengage wherein the locking plate is then displaced from alignment with the slots.

8. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame and a pair of knife rolls rotatably carried by said frame, a driven member mounted on one end of each roll, a pair of driving members journalled in one of the end walls adapted to be selectively engaged by said driven members for driving the rolls in opposite directions, said knife frame assembly being slidable along said pins between first and second positions, and means on said knife frame assembly coacting with the pins at the other end wall to automatically lock the end of the knife frame assembly adjacent to said other end wall to a corresponding pin when the assembly is in the position where the driven and driving members are engaged, said locking means including opposed vertical slots spaced inwardly from the free ends of said pins at the other end wall, and a locking plate on said knife frame assembly having spaced lugs which pass through the slots in said pins at the other end wall when the assembly is placed on the pins and hook the pins when the assembly is shifted to the position whereby the driven and driving members interengage.

9. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame having open bearing supports and a pair of knife rolls rotatably carried by said bearing supports, and means automatically locking the knife rolls to said bearing supports when the assembly is placed on said pins, said locking means including means responsive to engagement by said pins and movable over a substantial portion of said open bearing supports to lock the rolls to said knife frame when the assembly is placed on said pins.

10. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins including a knife frame, a pair of knife rolls rotatably carried by said frame, and means locking the knife rolls to said frame when the assembly is placed on said pins, said locking means including a movable plate actuated by positioning said assembly on said pins to lock said rolls to said frame.

11. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins including a knife frame, a pair of knife rolls rotatably carried by said frame, and means locking the knife rolls to said frame when the assembly is placed on said pins, said locking means including a pair of substantially U-shaped bearing supports for supporting one end of each roll on said assembly, said supports opening outwardly and having their axes extending substantially horizontally, and a movable plate on said assembly engageable by said pins and adapted to substantially close the open end of said U-shaped bearing supports when the assembly is positioned on said pins.

12. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins including a knife frame, a pair of knife rolls rotatably carried by said frame, and means locking the knife rolls to said frame when the assembly is placed on said pins, said locking means including a pair of substantially U-shaped bearing supports for supporting one end of each roll on said assembly, said supports opening outwardly and having their axes extending substantially horizontally, and a vertically movable plate on said assembly engageable by said pins and having lugs selectively movable over a portion of the open ends of said U-shaped bearing supports, whereby positioning of said assembly on said pins automatically moves said lugs and plate so that the lugs substantially cover the open ends of said bearing supports to thereby lock the knife rolls to said assembly.

13. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame and a pair of knife rolls rotatably carried by said frame, said knife frame assembly being slidable along said pins between first and second positions, means for driving said rolls in opposite directions including a pair of clutches, each clutch having a driving member mounted in one of the end walls and a driven member mounted on the end of a knife roll, and said members having engaging teeth slanted forwardly in the direction of rotation, whereby the teeth act to hold the members in engaged position during driving rotation of said driving members, a motor for driving said clutches, a reduction gear assembly between said clutches and said motor, and a resilient coupling interconnecting said motor and said reduction gear assembly, whereby binding of said knife rolls during operation of the machine binds the connection between the driving and driven members and exerts a torque on said coupling so that upon deenergization of said motor the coupling generates a reverse inertia in the rotatable motor components which is transmitted through the coupling to the driving members to give them a reverse direction inertia and unbind the connection and kick the knife frame assembly away from the driving members to thereby allow removal of the knife frame assembly from the machine.

14. A meat tenderizing machine comprising a housing, said housing having a bottomless chamber for receiving and tenderizing meat, a cover for selectively opening and closing said chamber, said chamber defined by opposed end walls, a rear wall and said cover, a pair of supporting pins extending inwardly from each end wall, a knife frame assembly supported on said pins, said knife frame assembly including a knife frame and a pair of knife rolls rotatably carried by said frame, a driven member mounted on one end of each roll, a pair of driving members journalled in one of the end walls adapted to be selectively engaged by said driven members for driving the rolls in opposite directions, said knife frame assembly being slidable along said pins between first and second positions, means on said knife frame assembly for automatically locking the knife rolls to said frame when the assembly is placed on said pins, and means on said knife frame assembly coacting with at least one of the pins on said other end wall to automatically lock the end of the knife frame assembly adjacent to said other end wall to a corresponding pin when the assembly is in the position where the driven and driving members are engaged.

15. The meat tenderizing machine of claim 1, including means for driving said rolls in opposite directions including a pair of clutches, each clutch having a driving member mounted in one of the end walls and a driven member mounted on the end of a knife roll, and said driving members having engaging teeth slanted forwardly in the direction of driving rotation, whereby the teeth act to hold the members in engaged position during driving rotation of said driving members.

16. The meat tenderizing machine of claim 1, including identifying means on the ends of said knife rolls and the knife frame to assure placing of each roll in its proper position on said frame.

17. The meat tenderizing machine of claim 16 wherein said identifying means includes matching colored plugs.

References Cited in the file of this patent

UNITED STATES PATENTS

| | | |
|---|---|---|
| 880,589 | Snelling | Mar. 3, 1908 |
| 2,513,025 | Jackson | June 27, 1950 |
| 2,561,867 | Jackson | July 24, 1951 |
| 2,598,548 | Jackson | May 27, 1952 |
| 2,607,951 | Moree | Aug. 26, 1952 |
| 2,640,334 | Spang | June 2, 1953 |
| 2,704,859 | Klingens | Mar. 29, 1955 |
| 2,807,055 | Brown | Sept. 24, 1957 |